(12) United States Patent
Bartfai et al.

(10) Patent No.: US 7,818,522 B2
(45) Date of Patent: Oct. 19, 2010

(54) APPARATUS, SYSTEM, AND METHOD FOR INCREMENTAL RESYNCHRONIZATION IN A DATA STORAGE SYSTEM

(75) Inventors: Robert F. Bartfai, Tucson, AZ (US); Michael E. Factor, Haifa (IL); Shachar Fienblit, Ein Ayala (IL); Olympia Gluck, Haifa (IL); Gail A. Spear, Tuscon, AZ (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 11/852,161

(22) Filed: Sep. 7, 2007

(65) Prior Publication Data

US 2009/0070528 A1    Mar. 12, 2009

(51) Int. Cl.
*G06F 13/00* (2006.01)
(52) U.S. Cl. .................................... 711/162
(58) Field of Classification Search ............... None
See application file for complete search history.

(56) References Cited

U.S. PATENT DOCUMENTS

| | | | |
|---|---|---|---|
| 6,662,268 B1 | 12/2003 | McBrearty et al. | |
| 7,133,986 B2 | 11/2006 | Spear et al. | |
| 7,165,141 B2 * | 1/2007 | Cochran et al. | ............. 711/114 |
| 7,188,222 B2 | 3/2007 | Micka et al. | |
| 2003/0170012 A1 | 9/2003 | Cochran | |
| 2003/0177306 A1* | 9/2003 | Cochran et al. | ............. 711/114 |
| 2003/0177322 A1 | 9/2003 | Crockett et al. | |
| 2004/0230859 A1 | 11/2004 | Cochran et al. | |
| 2005/0071708 A1* | 3/2005 | Bartfai et al. | .................. 714/5 |
| 2005/0223271 A1 | 10/2005 | Butterworth et al. | |
| 2005/0228957 A1 | 10/2005 | Satoyama et al. | |

* cited by examiner

*Primary Examiner*—Tuan V Thai
*Assistant Examiner*—Duc T Doan
(74) *Attorney, Agent, or Firm*—Griffiths & Seaton PLLC (57) ABSTRACT

An apparatus, system, and method are disclosed for performing an incremental resynchronization between two unrelated volumes when a third volume fails. The apparatus, system, and method include initiating registration of changed tracks; keeping track of bytes in flight activities between a local volume and an intermediate volume; recording the changed tracks in bitmaps at the local volume; stopping the recording of the changed tracks; and starting a resynchronization process by sending the changed tracks to a recovery volume.

30 Claims, 5 Drawing Sheets

APPARATUS, SYSTEM, AND METHOD FOR INCREMENTAL RESYNCHRONIZATION IN A DATA STORAGE SYSTEM

BACKGROUND OF THE INVENTION

1. Field of the Invention

This invention relates to an apparatus, system, and method for incremental resynchronization in a data storage system.

2. Description of the Related Art

Data storage system users may require a high degree of reliability and quick recovery from failures. Some data storage system users may require protection from data loss due to failures or disasters. For example, data storage system users such as financial institutions, retailers, and the like may demand a high degree of reliability for financial transactions, inventory control, etc. To help protect against data loss during a failure, a data storage system may be employed by the data storage system user.

The data storage system may include a storage area network ("SAN") connecting data storage volumes. For example, the data storage system may be configured as a three-site configuration in which three data storage volumes are used. In a three-site configuration the data storage system may include a first volume, a second volume, and a third volume. The first volume may be a production volume, a second volume may be an intermediate volume, and a third volume may be a recovery volume. When one of the data storage volumes fails, a full resynchronization process is usually performed.

SUMMARY OF THE INVENTION

The present invention includes an apparatus, system, and method to perform an incremental resynchronization in a data storage system. The present invention enables a differential resynchronization of two unrelated volumes when a third volume fails. Hence, the present invention avoids having to perform a full resynchronization of the two unrelated volumes during a disaster recovery.

The present invention in one embodiment provides an apparatus for implementing an incremental resynchronization. The apparatus comprises a "bytes in flight" (BIFLY) module comprising a computer readable program executing on a processor and configured to initiate registration of changed tracks and keep track of BIFLY activities between a local volume and an intermediate volume. The apparatus comprises a coordinator module comprising a computer readable program executing on a processor and configured to designate the first storage volume as a coordinator of the BIFLY activities. The apparatus also comprises a query module comprising a computer readable program executing on a processor and configured to query the intermediate volume for status of consistency groups ("CG") being formed at a remote volume. The apparatus further comprises a toggle module comprising a computer readable program executing on a processor and configured to toggle CR bitmaps, the CR bitmaps configured as N and N−1 bitmaps comprising the changed tracks.

In one embodiment, the apparatus comprises a BIFLY manager module to manage the "bytes in flight" between an intermediate and a remote volume. The BIFLY manager module is configured to perform a resynchronization between the local/production volume and a remote volume when an intermediate volume fails.

In one embodiment, a method of the present invention performs an incremental resynchronization. The method comprises initiating registration of changed tracks; keeping track of "bytes in flight" (BIFLY) activities between a local volume and an intermediate volume; querying the intermediate volume for status of consistency groups (CGs) being formed; toggling N and N−1 bitmaps at the local volume when certain conditions are true; and recording the changed tracks in at least one of the N and N−1 bitmaps at the local volume.

A system of the present invention is also presented to perform an incremental resynchronization in a three-site configuration. The system comprises a first storage volume designated as a coordinator; a second storage volume comprising a synchronous mirror copy of the first storage volume data; a third storage volume comprising an asynchronous mirror copy of the second storage volume data; and a host configured to write updates to the first storage volume which are then mirrored to the second storage volume and subsequently mirrored to the third storage volume. The host comprises a coordinator module configured to designate the first storage volume as coordinator of bytes in flight ("BIFLY") activities; a BIFLY module configured to initiate registration of changed tracks and keep track of BIFLY activities between a second storage volume and a third storage volume; a query module configured to query the second storage volume for status of consistency groups ("CG") being formed at a third storage volume; and a toggle module configured to toggle bitmaps. The bitmaps comprise the changed tracks.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
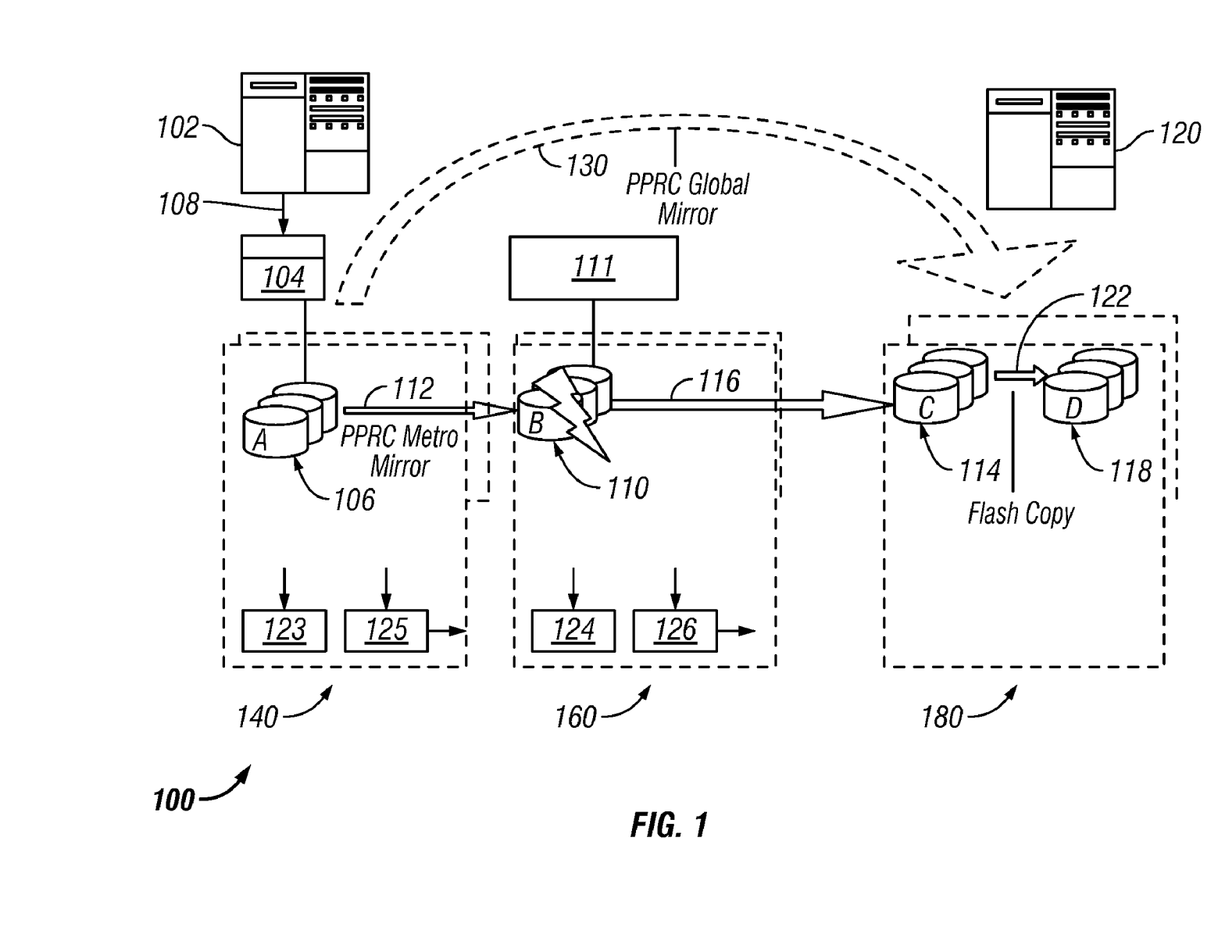
FIG. 1 is a schematic block diagram illustrating a three-site disaster recovery configuration in which an embodiment for an incremental resynchronization may be implemented in accordance with the present invention.

FIG. 1 is an exemplary schematic block diagram of a data storage system 100 in which certain embodiments for an incremental resynchronization are implemented in accordance with the present invention. The data storage system 100 may represent a three-site disaster recovery configuration in which volume A represents a production volume, volume B represents a local synchronously mirrored volume, and volume C represents a long distance asynchronous copy, located at an arbitrary distance from both volumes A and B.

The data storage system 100 may represent an IBM data storage system, such as IBM® TotalStorage® Enterprise Storage Server® (ESS). The ESS may be configured as a Peer-to-Peer Remote Copy (hereinafter "PPRC") Metro/Global mirror, The data storage system 100 includes a host 102 that sends data to a first storage controller 104 of a first storage volume 106. The first storage volume 106 is initially designated as a primary storage or production volume A and receives data from the first storage controller 104 over a local connection 108.

The data storage system 100 includes a second storage volume 110. The second storage volume 110 is a mirror data volume of the primary storage volume 106 and receives data over a synchronous connection 112 through an associated second storage controller 111. In one embodiment, the synchronous connection 112 is a Metro Mirror connection. The first storage controller 104 and first storage volume 106 are located at a local site, but may also be separated by some distance.

Updates received by the second storage volume 110 are also written to a third storage volume 114, which may be located remotely from the first and second storage volumes 106, 110. Updates are asynchronously sent to the third storage volume 114. The second and third storage volumes 110, 114 communicate over a connection 116 that may include fiber optic cables, copper cables, a wireless connection, etc. In one embodiment, the asynchronous connection 116 is a Global Mirror connection.

A fourth storage volume 118, in one embodiment, is located with the third storage volume 114. A third storage controller 120 facilitates copying data to the third storage volume 114 and from the third storage volume 114 to the fourth storage volume 118. In one embodiment, the storage controller 120 copies updates to the fourth storage volume 118 using a flash copy process 122 and updates are assembled in a chronological order on the fourth storage volume 118.

The second storage volume 110 may have one or more bitmaps to track data to be written asynchronously to a remote storage volume, such as third storage volume 114. For example, an array of bits, such as an active track array, changed track array, or change recording (hereinafter "CR") bitmap, may be used to keep a real-time record by tracking addresses on the storage volume initiating the asynchronous transfer of changes made since the last synchronization, or last time the storage volume initiating the asynchronous transfer and the remote storage volume were consistent. A second bitmap, such as a recovery track array, a copy track array, or out of synchronized (hereinafter "OOS") bitmap, may be used to designate which tracks have been written to the primary storage volume as part of an asynchronous write operation and still need to be copied to the remote storage volume.

In certain embodiments, system 100 comprises a local site 140, an intermediate site 160, and a remote site 180. The intermediate site 160 includes a CR bitmap 124 and an OSS bitmap 126 and a local site 140 toggles CR bitmaps. The local site 140 may also include a CR bitmap 123 and OOS bitmap 125. The local site 140 may include, for example, first storage controller 104 and first storage volume 106. The intermediate site 160 may include, for example, second storage controller 111 and second storage volume 110. If, for example, the first storage volume 106 and second storage volume 110 are out of sync., the first storage volume 106 may track the data with the OOS bitmap 125.

In certain embodiments, the second storage volume 110 includes the associated ("OOS") bitmap 126 that tracks when updates intended to be asynchronously copied to the third storage volume 114 are successfully copied.

The host 102 may be a server, a workstation, a personal computer, a laptop computer, and the like. In one embodiment, the host 102 includes a network of computers, servers, printers, routers, etc. In another embodiment, the host 102 is combined with the first storage controller 104. The host 102 may communicate with the storage controller 104, 111, 120 over a storage area network ("SAN"), a local area network ("LAN"), a wide area network ("WAN"), the Internet, a wireless network, etc. The host 102 may also be configured to send read requests, copy requests, or other data related requests to the storage controller 104, 111, 120. One of skill in the art will recognize other embodiments of the host 102 capable of sending a data write request to the storage controller 104, 111, 120.

The first storage controller 104 may be configured to receive write requests from the host 102 and to store files, updates to files, file information, etc. (hereinafter "updates") to one or more storage volumes 106, 110, 114, 118. In one embodiment, the first storage controller 104 is an enterprise storage system ("ESS") controller. In another embodiment, the first storage controller 104 is a TotalStorage® Enterprise Storage Server® from IBM®.

The first storage controller 104 may be a server, a workstation, a data mover, or a system of multiple components and computers. The first storage controller 104 may include non-volatile memory or write cache along with volatile memory or cache for temporarily storing updates. One of skill in the art will recognize other first storage controller 104 configurations capable of receiving a write request from the host 102 and storing updates related to the write request on a storage volume 106, 110, 114, 118.

The first storage volume 106 stores updates received from the first storage controller 104. The first storage volume 106 is designated as a primary storage or production volume A and receives updates directly from the first storage controller 104. The first storage volume 106 includes at least one portion of one hard disk drive ("HDD"), but may also include an array of disks that together form a volume. The first storage volume 106 may include a RAID array, Just a Bunch of Disks ("JBOD"), and the like. The first storage volume 106 may include tape drives, optical drives, and the like. In one embodiment, the first storage volume 106 includes one disk or an array of disks forming one volume. In another embodiment, the first storage volume 106 includes a plurality of storage volumes.

The one or more storage volumes of the first storage volume 106 are accessible to the first storage controller 104. The first storage volume 106, in one embodiment, includes a data mover, controller, or other device with a processor and memory to control the one or more storage volumes of the first storage volume 106 and to receive updates from the first storage controller 104. One of skill in the art will recognize other first storage volumes 106 capable of receiving an update from a first storage controller 104.

The host 102 may communicate with the storage controller 104 over connection 108. The connection 108 may include a SAN, a fiber connection, a small computer system interface ("SCSI"), local area network, routers, switches, and the like. Additionally, the data storage system 100 may be configured as a cascaded data storage system. As a cascaded data storage system 100, when the first storage volume 106 is designated as a production volume A, the first storage controller 104 sends updates from the host 102 directly to the first storage volume 106.

The second storage volume 110 is initially a synchronous mirror data volume of the first storage volume 106 and includes the same data as the first storage volume 106. The second storage volume 110 may be designated as an intermediate volume B and may have the same capacity, the same number of tracks, etc., as the first storage volume 106. The second storage volume 110 may be located at an intermediate site that is close enough to the first storage volume 106 to allow a connection that accommodates a synchronous connection without unacceptable performance degradation. The second storage volume 110, in one embodiment, is located with the first storage volume 106.

The data connection 112 between the first storage volume 106 (through the associated first storage controller 104) to the second storage volume 110 (through the associated second storage controller 111) is substantially similar to the host 102 to first storage controller 104 connection 108. The data connection 112 is capable of a synchronous connection between the first and second storage volumes 106, 110. The data system 100 includes a second storage controller 111 associated with the second storage volume 110 and substantially similar to the first storage controller 104.

The third storage volume 114 and fourth storage volume 118 are located remotely from the first and second storage volumes 106, 110. The third storage volume 114 and fourth storage volume 118 may be designated as recovery volume C. The third storage controller 120 associated with the third and fourth storage volumes 114, 118 are substantially similar to the first and second storage controllers 104, 111. The third storage volume 114 initially receives updates asynchronously from the second storage volume and controller 110, 111. The third storage controller 120, during an asynchronous operating mode, copies the updates received by the third storage volume 114 onto the fourth storage volume 118 using a flash copy process 122. The third storage controller 120 rearranges updates copied to the fourth storage volume 118 in a chronological order based on points in time when the third storage volume 114 was consistent with the second storage volume 110.

The data connection 116 may be wide area network connection, fiber network connection, etc. and may include fiber optic cable, copper cable, a wireless connection, hubs, routers, and the like. The third and fourth storage volumes 114, 118 are located remotely from the first and second storage volumes 106, 110 so that the data connection 116 between the second and third storage volumes 110, 114 is suitable for such distances.

The CR bitmap 124 and an OOS bitmap 126 associated with the second storage volume 110 may be stored and managed by the second storage controller 111. The CR bitmap 124, in one embodiment, tracks updates to the second storage volume 110 occurring after synchronization with the third storage volume 114 when the volumes were consistent. The OOS bitmap 126 tracks updates to be written to the third storage volume 114. Both bitmaps 124, 126 identify track addresses of updates to the storage volumes 110, 114.

For example, after the second and third storage volumes 110, 114 are consistent; the CR bitmap 124 is cleared. Subsequent updates to the second storage volume 110 are tracked in the CR bitmap 124. Periodically, the contents of the CR bitmap 124 are copied to the OOS bitmap 126. In one embodiment, the CR bitmap 124 is copied to the OOS bitmap 126 when the OOS bitmap 126 is cleared. The CR bitmap 124 is then cleared. In another embodiment, the CR bitmap 124 is merged with the contents of the OOS bitmap 126 and then the CR bitmap 124 is cleared. As updates are written from the second storage volume 110 to the third storage volume 114, the bits associated with the copied update are cleared from the OOS bitmap 126. If the CR bitmap 126 is not merged with the OOS bitmap 126, eventually the OOS bitmap 126 will be cleared.

In certain embodiments, first, second, third, and fourth storage volumes 106, 110, 114, 118 may include one or more volumes. In certain embodiments, first storage volume 106 may be designated as local volume A, second storage volume 110 may be designated as intermediate volume B, and both third and fourth storage volumes 114, 118 may be designated as recovery volume C.

As illustrated in FIG. 1, for example, when the intermediate site (volume B) fails, certain embodiments enable an incremental resynchronization to resynchronize the local volume A and remote/recovery volume C by keeping track of bytes in flight between the intermediate and remote volumes B, C. If volume B fails, Applicants' embodiment uses certain embodiments to perform a differential resynchronization by sending the changed tracks between the local and remote sites A, C (via PPRC Global Mirror 130). For example, in normal operation, global mirror sends data over connection 116 to remote volume C. When volume B fails, global mirror will transfer data from volume A to volume C over connection 130. This allows two unrelated volumes (e.g., first and third storage volumes 106, 114) of a three-site disaster recovery system to be resynchronized in a differential mode. That is, without having to perform a full resynchronization process during a disaster recovery. Thus, preserving the asynchronous backup of the production volume.

Figure 2:
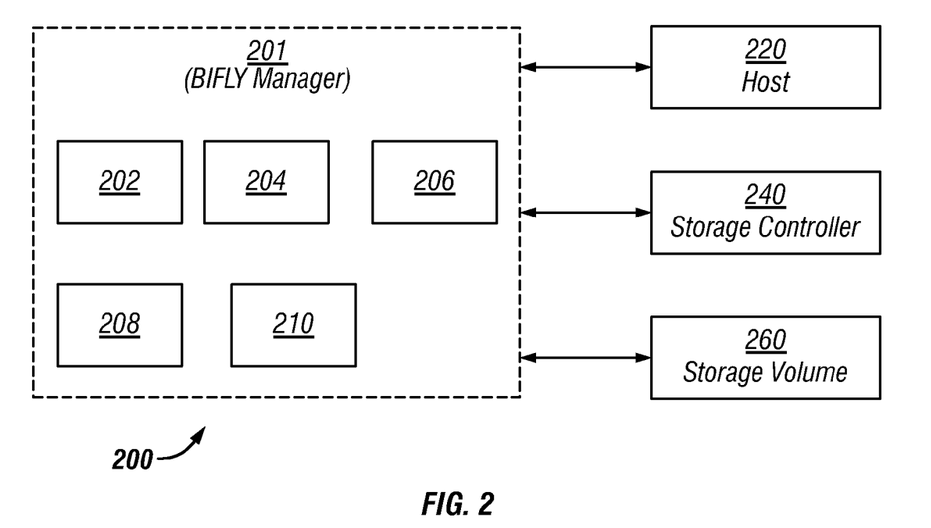
FIG. 2 is a schematic block diagram illustrating an embodiment of an apparatus for an incremental resynchronization in accordance with the present invention.

FIG. 2 is a schematic block diagram illustrating one embodiment of an apparatus 200 for an incremental resynchronization in accordance with the present invention. The apparatus 200 may be implemented to reconfigure a data storage system, such as the data storage system 100, to achieve resynchronization of two unrelated-volumes when a third volume fails. The failed volume can be the intermediate volume B in PPRC Metro/Global as illustrated in FIG. 1.

The apparatus 200 includes a "bytes in flight" (BIFLY) manager 201 comprising a BIFYL module 202, a coordinator module 204, a query module 206, a toggle module 208, a BIFLY manager module 210, which are described below. In one embodiment, the BIFLY manager module 210 comprises the BIFLY module 202, the coordinator module 204, the query module 206, and the toggle module 208.

As illustrated in FIG. 2, the apparatus 200 may be included with host 220. For example, apparatus 200 may be a hardware device comprising firmware to perform an incremental resynchronization between two unrelated volumes when a third volume fails in a three-site disaster recovery configuration. As such, apparatus 200 may be coupled to or included with host 220. Similarly, apparatus 200 may be coupled to or include with controller 240, and/or volume 260.

The BIFLY manager module 210, the BIFLY module 202, the coordinator module 204, the query module 206, and the toggle module 208 may be configured as software, hardware, or a combination of software and hardware. For example, the BIFLY manager module 210, the BIFLY module 202, the coordinator module 204, the query module 206, and the toggle module 208 may comprise one or more computer readable programs executing on one or more processors in one or more device, such as host 220, storage controller 260, and/or storage volume 260. In certain embodiments, modules 202-210 may share common data registers, memory, or the like.

In certain embodiments, the BIFLY manager 201 including one or more modules 202-210 may by implemented in a computerized system, such as system 100 in FIG. 1. For example, the BIFLY manger module 210 may be implemented in system 100 via a processor. The processor may be located in the system 100, such as host 102, volume 106, controller 104, etc.

The executables of modules 202-210 need not be physically located together, but may comprise disparate instructions stored in different locations of a system (e.g., system 100) which when joined logically together, comprise one or more modules 202-210 and achieve the state purpose for modules 202-210.

In one embodiment, the apparatus 200 is included in a volume, such as first storage volume 106. In other embodiments, the apparatus 200 may be included in at least one of the other storage volumes, such as storage volumes 110, 114, respectively. In yet other embodiments, the apparatus 200 may be included in at least one of storage controllers 104, 111, 120. One of skill in the art will recognize other locations for the apparatus 200 to activate an incremental resynchronization.

In certain embodiments, the BIFLY module 202 may be initiated and/or deployed on the first and second storage volumes 106, 110, such as, local volume A and intermediate volume B, where the changed tracks are recorded. For example, in a PPRC Metro/Global Mirror, BIFLY module 202 may be implemented by the first storage volume 106, which is designated as the coordinator of "bytes in flight" (BIFLY) activities.

In one embodiment, first storage volume 106 (via coordinator module 204) is designated coordinator of the BIFLY activities, such as but not limited to, registering the changed tracks and tracking "bytes in flight." In one embodiment, local volume A starts the recording of the changed tracks, coordinates the toggling of CR bitmaps, and stops the recording of the changed tracks via the BIFLY module 202. The changed tracks may be recorded in bitmaps at volume A, such as CR bitmaps 123 and/or OOS bitmaps 125 (FIG. 1). In this manner, for example, when there is a disaster at volume B (i.e., intermediate site 160), the CR bitmaps are not lost because they are at the surviving site (i.e., volume A of local site 140).

In certain embodiments, the CR bitmaps are configured as two sets of bitmaps: N and N−1. As such, the writes are recorded in the N bitmap and the N−1 bitmap is the zeroed out bitmap. In certain embodiments, the N and N−1 bitmaps are located at a surviving site, such as local site 140 for a cascading system and intermediate site 160 for a multi-target system. The BIFLY module 202 may use the two sets of bitmaps: N and N−1 to perform a resynchronization (sending only changed tracks) between first and third storage volumes 106, 114 when the second storage volume 110 fails.

In one embodiment, the BIFLY module 202 toggles the CR bitmaps 124 via toggle module 208 when a threshold or certain conditions are accomplished or satisfied. The determination of whether certain conditions are accomplished may be implemented via query module 206. For example, local volume A may periodically send to the intermediate volume B new query commands requesting the status of the consistency groups (hereinafter "CG"). By querying the intermediate volume B, the local volume A will know when a CG is successfully created at the intermediate site. For example, in response to the query, intermediate volume B would return the count of successful created Global Mirror CGs.

For illustrative purposes, FIG. 2 depicts the BIFLY module 202, the coordinator module 204, the query module 206, and the toggle module 208 as being individual modules. In certain embodiments, the BIFLY module 202 may comprise one or more of the coordinator module 204, the query module 206, and the toggle module 208. In certain embodiments, the BIFLY manager module 210 may include one or more of the BIFLY module 202, the coordinator module 204, the query module 206, and the toggle module 208.

In one embodiment, the BIFLY manager module 210 manages modules 202, 204, 206, 208 in order to perform a differential resynchronization by sending only the changed tracks from the first storage volume to the third storage volume when the second storage volume has failed. For example, the BIFLY manager module 210 may comprise a computer readable program executing on a processor and configured to manage the resynchronization of two unrelated volumes when a third volume fails.

In one embodiment, the BIFLY manager module 210 manages the various functions of the modules 202, 204, 206, 208. For example, the BIFLY manager module 210 manages the initiation of registration of the changed tracks, manages the tracking of bytes in flight activities, manages the toggling of the CR bitmaps, manages the stopping of the recording of the changed tracks, and manages the starting of the resynchronization process by sending the track changes. In one embodiment, the BIFLY manager module 210 sends the track changes over communication line 130 when volume B fails. Hence, the BIFLY manager module 210 may be deployed as software in a computerized system to manage all activities relating to bytes in flight.

In one embodiment, the BIFLY module 202 comprises a computer readable program executing on a processor and configured to initiate registration of changed tracks and keep track of "bytes in flight" activities between the first storage volume 106 and second storage volume 110. The coordinator module 204 comprises a computer readable program executing on a processor and configured to designate the first storage volume 106 as the coordinator of the BIFLY activities. The query module comprises a computer readable program executing on a processor and configured to query the second storage volume 110 for status of consistency groups ("CG") being formed at the third storage volume 114.

For example, the query module queries the intermediate site B (e.g., second storage volume 110) for the sequence number of the last successful CG created and the count of CG. The query is used to determine if a threshold is satisfied. Based on the threshold, (e.g., three successfully created CG at second storage volume 110), the BIFLY module 202 may toggle the bitmaps and record in the bitmap it was not previously using (i.e., either N or N−1).

In certain embodiments, the toggle module 208 comprises a computer readable program executing on a processor and configured to toggle bitmaps having the changed tracks, such as CR bitmaps and/or OOS bitmaps. The toggling of the CR bitmaps (N and N−1) via toggle module 208 may be condition on any one or combination of the following conditions: the primary PPRC device is full duplex, at least three CGs are formed and a period of time (e.g., at least 2.5 seconds have elapsed) between the last bitmaps toggle and the first query after the toggle.

Figure 3:
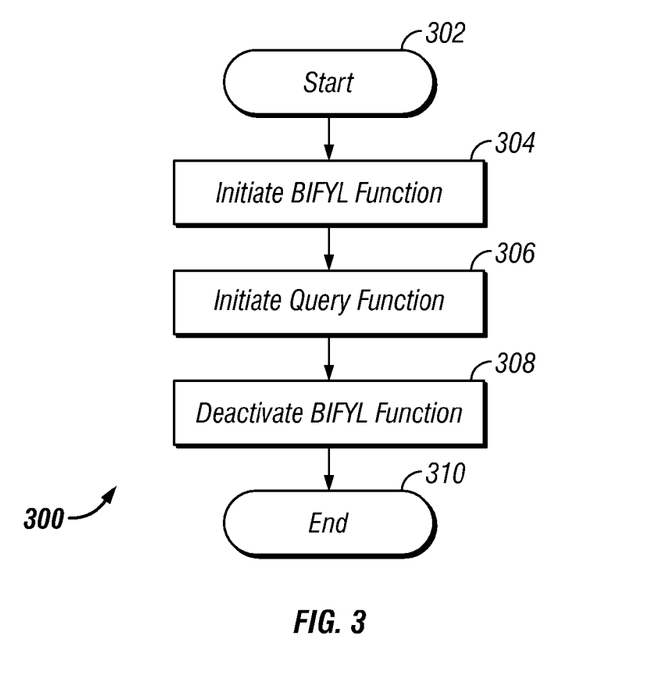
FIG. 3 is a schematic flow chart diagram illustrating an embodiment of a method for an incremental resynchronization in accordance with the present invention.

FIG. 3 is a schematic flow chart diagram illustrating an embodiment of a method 300 for an incremental resynchronization in accordance with the present invention. The method 300 may be deployed in a computerized system, such as system 100, for example. In one embodiment, the method 300 is implemented with a computer readable program. The computer readable program may be executed by a processor and/or computer. In certain embodiments, the processor may be located in the system 100, such as host 102, volume 106, controller 104, etc. The method 300 begins 302 and proceeds to step 304.

In step 304, the BIFLY function is initiated. The initiation of the BIFLY function may be deployed on local volume A via BIFLY manager 210, for example. In certain embodiments, the initiation of the BIFLY function may be deployed via BIFLY module 202 in host 102 or first controller 104. In other embodiments, the initiation of the BIFLY function may be deployed via BIFLY module 202 in first storage volume 106.

In step 304, the BIFLY initiation function initializes the BIFLY data at a local volume, such as local volume A, and starts a change recording ("CR") mode. In certain embodiments, for example, if the configuration of system 100 is cascading, the BIFLY functions runs at local site 140. In certain embodiments, if the configuration of system 100 is multi-target, the BIFLY functions run at intermediate site 160.

In step 306, the BIFLY query function queries a second storage volume, such as second storage volume 110. The BIFLY query function may be periodically initiated by, for example, the coordinator module 204 located on volume 106. For example, local volume A may periodically initiate a query to intermediate volume B. In certain embodiments, the BIFLY manager 210 may perform the query. In other embodiments, the BIFLY module 202 may perform the query.

In step 306, the query may return the sequence number of the last successful CG created and the count of CGs. The sequence number and the counter of CGs may be maintained at the intermediate volume B, such as second storage volume 110 (FIG. 1).

In certain embodiments, a timing mechanism may be used as part of the query process of step 306. The timing mechanism is used to time the queries so they are done periodically. For example, in one embodiment, the timing mechanism is set such that the time between queries is 5 seconds. In another embodiment, for example, the timing is set at; at least 2.5 seconds intervals. One skilled in the art will appreciate that Applicants' timing mechanism is not limited to the above examples, and may be set at any time interval, such as 1, 2, 3, 4, 5, . . . n seconds.

In certain embodiments, method 300 may use the BIFLY manager 210 to perform the toggling. In other embodiments, method 300 may use the BIFLY module 202 to perform the toggling. In yet other embodiments, method 300 may use the coordinator module 204 to perform the toggling.

Although step 308 is depicted as following after step 306, this is only to illustrate the deactivation of the BIFLY function. Step 308 does not have to logically follow step 306 in sequence. For example, in certain embodiments, the deactivation may occur on command, which means step 308 may occur at any time including before/during/after the query.

In one embodiment, the BIFLY deactivation function may stop all BIFLY related activities, including, but not limited to, recording of the tracks in CR bitmaps (N and N−1), toggling of the CR bitmaps, stopping the timing mechanism if there are no more devices with BIFLY function active, and resetting the data related to BIFLY. Also, the deactivation function may either wait to complete the on going BIFLY activities or may mark to not start further BIFLY activities.

In certain embodiments, there may be more than one type of BIFLY deactivation function performed in step 308. For example, the BIFLY deactivation function may be device oriented in which, the BIFLY function is stopped for a specific device. In this orientation, step 308 may execute the following steps to deactivate the BIFLY on a device. First, BIFLY deactivation function may determine if the device is a unique device with active BIFLY. If yes, the BIFLY function stops. Second, BIFLY deactivation function may stop the CR mode (BIFLY client, for example) at the local site 140 (i.e., volume A). Third, BIFLY deactivation function may change the state of volume to BIFLY inactive.

The BIFLY deactivation function performed in step 308 may be implemented via any one of or combination thereof: BIFLY manager module 210, BIFLY module 202, coordinator module 204, query module 206, and toggle module 208.

Method 300 may be implemented in a three-site data storage system configuration, such as a PPRC Metro/Global Mirror, or PPRC Multi Target, to perform a differential resynchronization when an intermediate (Metro/Global Mirror) site (e.g., second storage volume 110) fails, or when a local site (PPRC multi-target) storage volume 106 fails for example. Accordingly, method 300 avoids having to perform a full resynchronization process.

For example, implementing method 300 in system 100 (FIG. 1), the "bytes in flight" are recorded at a local site 140 (e.g., first storage volume 106) via BIFLY module 202. The CR mode, in step 306, keeps track of "bytes in flight" between the intermediate site 160 and remote site 180 (e.g., second and third storage volumes 110, 114, respectively). When the intermediate site 160 fails, the BIFYL module 202 enables resynchronization of the local site 140 (e.g., first storage volume 106) and the remote site 180 (e.g., third storage volume 114).

In one embodiment, during normal running, the CR bitmaps are toggled as the CGs are formed. If, for example, the intermediate site 160 fails, the contents of both CR bitmaps (N and N−1) are merged. The results of the merged content of N and N−1 bitmaps are then merged into an OOS bitmap at local site 140, (e.g., first storage volume 106). The data represented by the OOS bitmap is transferred over connection 130 to remote site 180 (e.g., third storage volume 114). In certain embodiments, once the CR bitmaps are merged into the OOS bitmap, they are no longer used or toggled. The local site 140 (e.g., first storage volume 106) toggles (step 304) the CR bitmaps 124 by issuing queries (step 306) via query module 206 to the intermediate site 160 (e.g., second storage volume 110) to get the status of the consistency groups (CGs) being formed at the intermediate site 160 (e.g., second storage volume 110). When certain conditions are true, the local site 140 (e.g., first storage volume 106) toggles the CR bitmaps 124 via toggle module 208. Some examples of certain conditions being true are when there is a certain number of CGs formed (e.g., at least 3 CGs are formed) and a period of time has passed (e.g., at least 2.5 seconds have elapsed), etc.

In certain embodiments, the BIFYL initiation function 304 may be implemented either when a new PPRC Pair is established or when the PPRC Pair is already established. The implementation may be performed via BIFYL module 210, for example. An option, such as a parameter, may be added to the Establish PPRC Pair, which is the local PPRC pair in a PPRC Metro/Global configuration. The BIFLY module 202 may be stopped either by issuing a Terminate PPRC Pair command at the local volume A (e.g., first storage volume 106), or by issuing an Establish PPRC Pair command with option "BIFYL" turned OFF.

To establish a new PPRC Pair between the local volume A (e.g., first storage volume 106) and the remote volume C (e.g., third storage volume 114), an Establish PPRC Pair command with option "Establish with BIFYL" may be issued to the local site (e.g., first storage volume 106). The tracks recorded in the CR bitmaps 124 may be merged into OOS bitmaps 126 and the resynchronization process may be started between local site (first storage volume 106) and remote site (third storage volume 114). The CR initiated by BIFYL manager module 210 (or BIFLY module 202) is stopped.

In one embodiment, the establishment of the new PPRC pair between the first storage volume 106 and third storage volume 114 is through a data connection 130 (FIG. 1). The data connection 130 is capable of an asynchronous connection between the first and third storage volumes 106, 114.

The data connection 130 may be wide area network connection, fiber network connection, etc. and may include fiber optic cable, copper cable, a wireless connection, hubs, routers, and the like. The third and fourth storage volumes 114, 118 are located remotely from the first and second storage volumes 106, 110 so that the data connection 130 between the first and third storage volumes 106, 110 are suitable for such distances.

Figure 4:
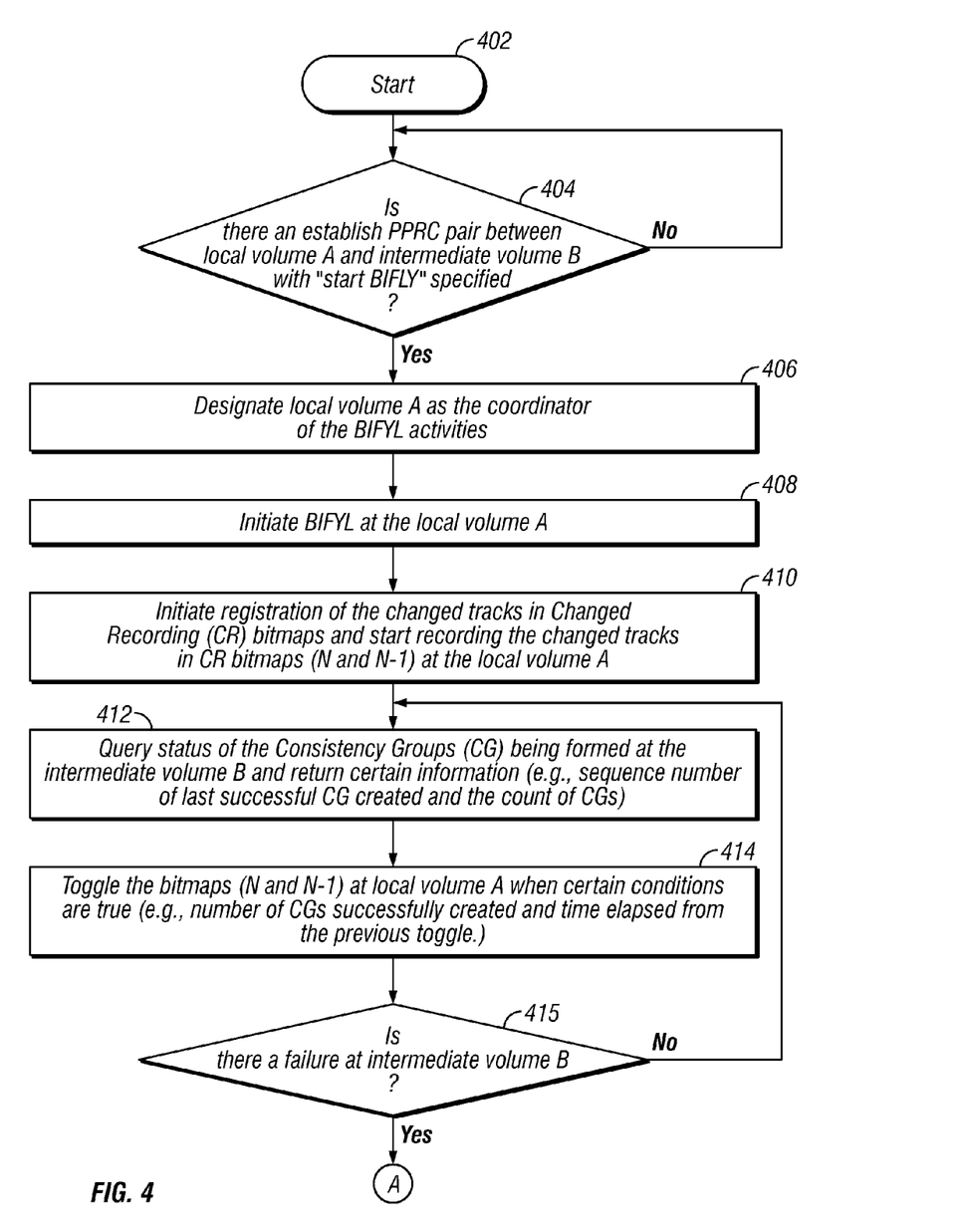
FIG. 4 is a schematic flow chart diagram illustrating an embodiment of a method for an incremental resynchronization in accordance with the present invention.

FIG. 4 is a schematic flow chart diagram illustrating an embodiment of a method 400 for an incremental resynchronization in accordance with the present invention. Method 400 may be deployed in a computerized system, such as system 100 in FIG. 1. In certain embodiments, method 400 may be deployed in first storage volume 106, (e.g., volume A) via BIFLY manager 210, for example. Method 400 may also be deployed in first storage volume 106 via BIFLY module 202. For example, in certain embodiments, method 400 may be implemented via BIFLY module 202 in host 102 or first controller 104. In other embodiments, method 400 may be implemented via BIFLY module 202 in first storage volume 106. In yet other embodiments, method 400 may be implemented in any one of host 102, 120, controllers 104, 111, and volumes 106, 110, 114, 118 or combination thereof.

In one embodiment, the method 400 is implemented with a computer readable program. The computer readable program may be executed by a processor. The processor may be located in the system 100, such as host 102, volume 106, controller 104, etc.

The method 400 begins 402 and proceeds to step 404 where it is determine if there is an establish PPRC Pair between local volume A and intermediate volume B with "start BIFLY" specified. Local volume A may correspond to first storage volume 106 and intermediate volume B may correspond to second storage volume 110. In certain embodiments, the determination may be performed via BIFLY manager module 210. In other embodiments, the BIFLY module 202 may perform the determination. If there is no established PPRC Pair, step 404 repeats. If there is an established PPRC Pair, step 404 proceeds to step 406.

In step 406, method 400 designates local volume A as the coordinator of the BIFLY activities. In certain embodiments, the coordinator module 204 designates first storage volume 106 to coordinate the BIFLY activities. In other embodiments, the BIFLY manager module 210 designates local volume A. Step 406 proceeds to step 408.

In step 408, method 400 initiates the BIFLY function on local volume A (e.g., first storage volume 106). In certain embodiments, the coordinator module 204 initiates the BIFLY function. In other embodiments, the BIFLY manager module 210 initiates the BIFLY function. In yet other embodiments, the BIFLY module 202 initiates the BIFLY function. For example, BIFLY module 202 initiates the BIFLY function via host 102, first storage controller 104, and/or first storage volume 106. Step 408 proceeds to step 410.

In step 410, method 400 initiates registration of the changed tracks in CR bitmaps and starts recording the changed tracks in CR bitmaps at the local level (e.g., first storage volume 106 or second storage volume 110). The CR bitmaps may be configured as two bitmaps: (N and N−1). In certain embodiments, the coordinator module 204 performs step 410. In other embodiments, the BIFLY manager module 210 performs step 410. In other embodiments, the BIFLY module 202 performs step 410. For example, BIFLY module 202 performs step 410 via host 102. Step 410 proceeds to step 412.

In step 412, method 400 queries the status of the consistency groups (CGs) being formed at the intermediate volume (e.g., second storage volume 110). In certain embodiments, the BIFLY manager module 210 performs step 412. In other embodiments, the BIFLY module 202 performs step 412. For example, BIFLY module 202 performs step 412 via host 102 or first controller 104. In other embodiments, query module 206 queries the status of the CGs being formed at the intermediate volume B. Step 412 proceeds to step 414.

In step 414, method 400 toggles the CR bitmaps (e.g., N and N−1). In one embodiment, the toggling of the CR bitmaps is at local volume A (e.g., first storage volume 106). In certain embodiments, the CR bitmaps are toggled in response to certain conditions being satisfied or true. For example, the (N and N−1) bitmaps are toggled in response to a certain number of CGs being successfully formed (e.g., 3 CGs being formed) and/or a minimum time period/limit (e.g., at least 2.5 seconds have elapsed). The toggling may be performed via toggle module 208, for example. In certain embodiments, the BIFLY manager module 210 performs step 414. In other embodiments, the BIFLY module 202 performs step 414.

In step 414, the toggling of the CR bitmaps (e.g., N and N−1) may be based on several variables, including, but not limited to, the PPRC state of the volume, the number of CGs successfully created at the intermediate site (e.g., second storage volume 110), and the time elapse from the previous toggle. For example, the CR bitmaps (N and N−1) may be toggled when the primary PPRC device is full duplex, at least three CGs are formed, and at least 2.5 seconds has elapsed between the last bitmaps toggled and the first query after the toggle.

In step 415, it is determined if a failure occurred (e.g., volume A or volume B has failed). If there is not a failure, step 415 proceeds to step 412. If a failure has occurred, then step 415 proceeds to step 416. In one embodiment, step 415 proceeds to step 416 automatically. In another embodiment, step 415 proceeds step 416 at the direction from a host, such as host 102.

In step 416, method 400 stops recording of the changed tracks in CR bitmaps (N and N−1). Step 416 proceeds to step 417. In step 417, the contents of the N and N−1 bitmaps are merged and then the result of the N and N−1 bitmaps is merged into the OOS bitmap for resynchronization between local site (e.g., volume A) and remote site (e.g., volume C).

In step 418, method 400 designates local volume A (first storage volume 106) as the new PPRC primary volume for volume C. Step 418 proceeds to step 420. In step 420, the method 400 starts resynchronization process between local volume A and recovery volume C. For example, between first and third storage volumes 106, 114. Recovery volume C may correspond to third storage volume 114. Step 420 proceeds to step 422 and ends.

In certain embodiments, method steps 402-422 may be implemented via BIFLY manager 210, BIFLY module 202, query module 206, coordinator module 204, toggle module 208 or any combination thereof.

Figure 5:
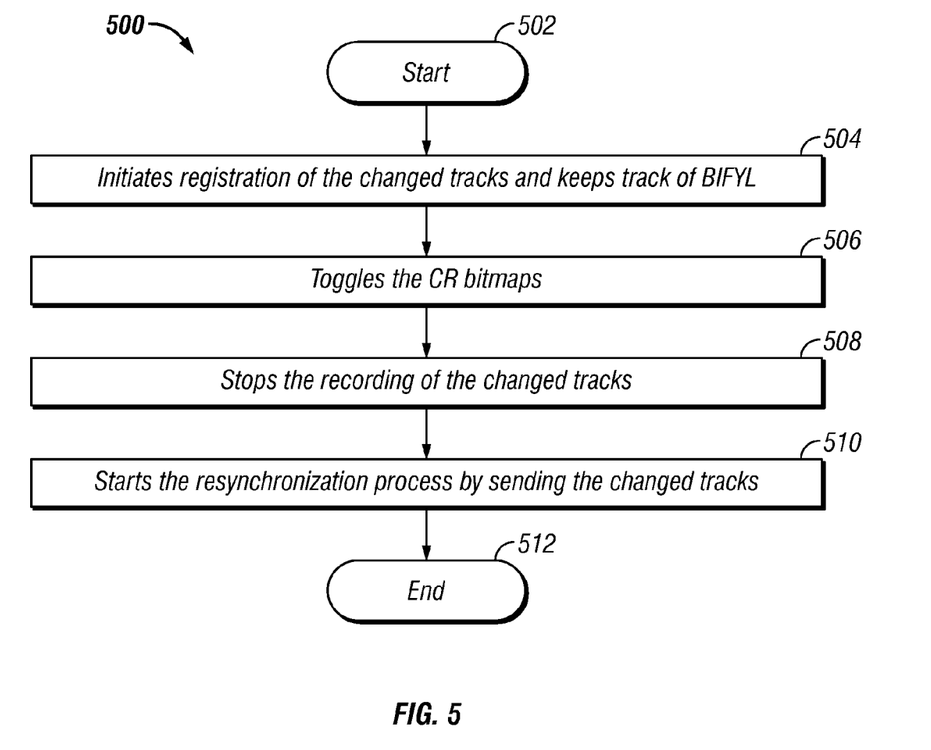
FIG. 5 is a schematic flow chart diagram illustrating an embodiment of a method for an incremental resynchronization in accordance with the present invention.

FIG. 5 is a schematic flow chart diagram illustrating an embodiment of a method 500 for an incremental resynchronization in accordance with the present invention. The method 500 may be deployed in a computerized system, such as system 100. In one embodiment, the method 500 is implemented with a computer readable program. The computer readable program may be executed by a processor. The processor may be located in the system 100, such as host 102, volume 106, controller 104, etc.

Method 500 represents one embodiment of an incremental resynchronization process, in which the method 500 begins 502 and proceeds to step 504.

In step 504, method 500 initiates registration of the changed tracks and keeps track of "bytes in flight". The changed tracks are recorded in CR bitmaps, such as CR bitmaps 124. Step 504 proceeds to step 506.

In step 506, method 500 toggles the CR bitmaps. The toggling of the CR bitmaps may be a function of several variables, such as the PPRC state of volume (full duplex), a threshold number of Global Mirror CGs (e.g., at least 3 Global Mirror CGs) successfully created at the intermediate site (second storage volume 110); the time elapsed from the previous toggle and the first query after the toggle. The first query after the toggle may reset the data on the local and intermediate volumes (first storage and second storage volumes 106, 110). The next queries may trigger the toggle if the returned data indicates the threshold number of Global Mirror CGs was created at the intermediate site. For example, if the threshold number is set to at least 3 Global Mirror CGs, and the returned data indicates this, the toggling of the CR bitmaps (CR bitmaps 124) is performed. Step 506 proceeds to step 508.

In step 508, method 500 stops the recording of the changed tracks, upon a detection of a failed volume (e.g., intermediate volume B). The CR bitmaps are merged. For example, CR bitmaps are configured as N and N−1 bitmaps and their contents are merged. The results (e.g., tracks in flight) are then merged to an OOS bitmaps. Step 508 proceeds to step 510. In step 510, method 500 starts the resynchronization process by sending the changed tracks. In one embodiment, method sends the changed tracks from first storage volume 106 to third storage volume 114 via PPRC Global Mirror 130. Step 510 proceeds to step 512 and ends.

In one embodiment, method 500 uses two sets of bitmaps. For example, bitmaps N and N−1. The writes are recorded in the N bitmap and the N−1 bitmap is the zeroed out bitmap. Method 500 further designates a coordinator volume to decide when to toggle the bitmaps and initiates the toggle process on the local site. The coordinator volume may correspond to first storage volume 106.

The implementation of the coordinator volume may be activated via any one of modules 202, 204, 206, 208, 210, or combination thereof. For example, the first storage volume 106 may be designated as the coordinator volume via coordinator module 204 implemented in host 102, first storage controller 104, or first storage volume 106. The modules 202, 204, 206, 208, 210 may be implemented, for example, in any one or combination of host 102, 120, controller 104, 111, or volumes 106, 110, 114, 118 via a processor.

In one embodiment, the local site volume (first storage volume 106) periodically queries the intermediate site volumes (second storage volume 110) for the count of successfully created Global Mirror CGs. The decision to toggle the bitmaps may be based, in part, on the information received during the query. To ensure that at the time of the toggling the writes represented in the bitmaps are hardened at the remote volumes (third storage volume 114), the local site queries the intermediate site. By issuing queries to the intermediate volume (second storage volume 110), the local volume (first storage volume 106) receives the status of the Global Mirror CGs being formed at the remote site (third storage volume 114). When the bytes in flight are secured at the remote site (third storage volume 114), the bitmaps can be toggled.

Although the implementation of certain embodiments of the present invention are described in relation to a PPRC Metro/Global Mirror configuration as depicted in FIG. 1, this is for illustrative purposes. Accordingly, certain embodiments of the present invention may be implemented in other data storage systems, such as PPRC Multi Targets.

For example, implementing methods 300, 400, and 500 in a PPRC Multi Targets configuration, the local volume B is resynchronized to the recovery/remote volume C or the recovery/remote volume C is resynchronized to the local volume B. The resynchronization of local volume B or recovery volume C will depend in part on which volume is recently updated. Prior to resynchronization, both local volume B and recovery volume C keep track of "bytes in flight" that are involved in PPRC Metro and Global Mirror running at production volume A. In certain embodiments, the present invention utilizes the "bytes in flight" to determine and to inform the user which volume (volume B or volume C) is more updated and the user may decide which direction to establish the pair.

As illustrated in FIGS. 1-5, certain embodiments of the present invention provide the capability to incrementally resynchronize two unrelated volumes when a third volume fails. The failed volume can be the intermediate volume B, for example, as in PPRC Metro/Global Mirror configuration, or the production volume A as in other configurations. The loss of a volume, such as the intermediate volume B, results in stopping the replication to the recovery (remote) volume C. When the production is resumed, certain embodiments of the present invention allow a differential resynchronization to take place by sending the changed tracks. This avoids having to perform a full resynchronization.

The described operations in FIGS. 1-5 may be implemented as a method, apparatus or article of manufacture using standard programming and/or engineering techniques to produce software, firmware, hardware, or any combination thereof. The described operations in FIGS. 1-5 may be implemented as code maintained in a computer readable medium, where a processor may read and execute the code from the computer readable medium.

A computer readable medium as described in relation to FIGS. 1-5 may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented as hardware logic in a hardware device (e.g., an integrated circuit chip, Programmable Gate Array (PGA), Application Specific Integrated Circuit (ASIC), etc.).

The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

Apparatus 200 as depicted in FIG. 2, may also be referred to as an article of manufacture comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The illustrated operations of FIGS. 3, 4, and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable medium having computer readable program, wherein the computer readable program when executed on a computer causes the computer to:

transmit data including tracks synchronously from a local volume to an intermediate volume;

transmit the data asynchronously from the intermediate volume to a first remote volume via a first asynchronous connection;

transmit the data, via a flash copy process, from the first remote volume to a second remote volume;

initiate registration of changed tracks of the data;

keep track of "bytes in flight" (BIFLY) activities between the local volume and the intermediate volume;

record the changed tracks in bitmaps at the local volume, and upon failure of the intermediate volume:

stop the recording of the changed tracks; and start a resynchronization process by asynchronously transmitting the changed tracks from the local volume to the first remote volume via a second asynchronous connection.

2. The computer program product of claim 1, wherein the bitmaps are configured as two sets of bitmaps: N and N−1.

3. The computer program product of claim 2, further comprising querying the status of a consistency group ("CG") being formed at the intermediate volume.

4. The computer program product of claim 3, further comprising toggling the N and N−1 bitmaps at the local volume when certain conditions of the CG are satisfied.

5. The computer program product of claim 4, wherein the contents of the N and N−1 bitmaps are merged at the local volume.

6. The computer program product of claim 5, wherein the results of the merged N and N−1 bitmaps are merged into an Out-of-Synchronized bitmap.

7. The computer program product of claim 6, wherein the intermediate volume and the remote volume are resynchronized with bytes in flight between the local volume and the first remote volume.

8. The computer program product of claim 1, further comprising determining if there is an established Peer-to-Peer Remote Copy Pair between the local volume and the intermediate volume.

9. The computer program product of claim 8, further comprising designating the local volume as a coordinator of the BIFLY activities.

10. A method, comprising:

transmitting data including tracks synchronously from a local volume to an intermediate volume;

transmitting the data asynchronously from the intermediate volume to a first remote volume via a first asynchronous connection;

transmitting the data, via a flash copy process, from the first remote volume to a second remote volume;

initiating registration of changed tracks of the data and keeping track of bytes in flight ("BIFLY") activities between the local volume and the intermediate volume;

querying the intermediate volume for status of consistency groups (CGs) being formed;

toggling N and N−1 bitmaps at the local volume when certain conditions are true;

recording the changed tracks in at least one of the N and N−1 bitmaps at the local volume, and upon failure of the intermediate volume:

stopping the recording of the changed tracks in the N and N−1 bitmaps; and start a resynchronization process by asynchronously transmitting the changed tracks from the local volume to the first remote volume via a second asynchronous connection.

11. The method of claim 10, further comprising merging the contents of the N and N−1 bitmaps.

12. The method of claim 11, further comprising merging the results of the N and N−1 merged bitmaps into an Out-of-Synchronized bitmap.

13. The method of claim 12, further comprising designating the local volume as a new Peer-to-Peer Remote Copy primary volume and starting resynchronization process between the local volume and the first remote volume.

14. The method of claim 10, wherein the toggling of the bitmaps at the local volume is based on at least one of a number of CGs being formed and a minimum time period.

15. The method of claim 14, wherein the number of CGs being formed is based on at least 3 CGs being formed.

16. The method of claim 14, wherein the minimum time is at least 2.5 seconds.

17. An apparatus for implementing an incremental resynchronization, the apparatus comprising:

a local volume;

an intermediate volume coupled to the local volume via a synchronous connection and configured to synchronously receive data from the local volume;

a first remote volume coupled to the intermediate volume via a first asynchronous connection and coupled to the local volume via a second asynchronous connection;

a second remote volume coupled to the first remote volume, the second remote volume configured to receive data from the first remote volume via a flash copy process;

a processor coupled to the local volume and the first remote volume; and memory coupled to the processor, the memory configured to store:

a bytes in flight ("BIFLY") module comprising a computer readable program executing on the processor and configured to initiate registration of changed tracks and keep track of BIFLY activities between the local volume and the intermediate volume;

a coordinator module comprising a computer readable program executing on the processor and configured to designate the local volume as a coordinator of the BIFLY activities;

a query module comprising a computer readable program executing on the processor and configured to query the intermediate volume for status of consistency groups ("CG") being formed; and a toggle module comprising a computer readable program executing on the processor and configured to toggle Change Recording (CR) bitmaps, the CR bitmaps configured as N and N−1 bitmaps comprising the changed tracks, wherein the processor is configured to detect an unavailability of the intermediate volume and start a resynchronization process to utilize the second asynchronous connection to asynchronously transmit the changed tracks from the local volume to the first remote volume.

18. The apparatus of claim 17, wherein the N and N−1 bitmaps are located at a surviving site, the surviving site being defined as the local volume for a cascading storage system and being defined as the intermediate volume for a multi-target storage system.

19. The apparatus of claim 18, wherein, upon a failure of either the local volume or the intermediate volume, the contents of N and N−1 bitmaps at the surviving site are merged and the results of the merged N and N−1 bitmaps are merged into an Out-of-Synchronization bitmap located at the surviving site.

20. The apparatus of claim 19, wherein the BIFLY module starts resynchronization between the surviving site volume and the first remote volume by transmitting the changed tracks to the first remote volume.

21. The apparatus of claim 17, wherein the query module includes a timing mechanism, wherein the timing mechanism is configured to issue periodical queries to the intermediate volume.

22. The apparatus of claim 17, wherein the toggle module toggles the N and N−1 bitmaps based on at least 3 CGs formed at the intermediate volume.

23. The apparatus of claim 17, further comprising a BIFLY manger module comprising a computer readable program executing on the processor and configured to manage and deactivate the BIFLY activities.

24. A system to implement an incremental resynchronization, the system comprising:
a first storage volume configured to store first data including changed tracks;
a second storage volume coupled to the first storage volume via a first connection, the second storage volume configured to receive a synchronous mirror copy of the first data from the first storage volume and store the synchronous mirror copy as second data;
a third storage volume coupled to the first storage volume via a second connection and coupled to the second storage volume via a third connection, the third storage volume configured to receive an asynchronous mirror copy of the second storage volume data from the second storage volume and store the asynchronous copy as third data;
a fourth storage volume coupled to the third storage volume and configured to receive the third data and store, via a flash copy process, the third data as fourth data; and
a host configured to store updates to the first storage volume data and the second storage volume data, the host comprising:
a coordinator module configured to designate the first storage volume as coordinator of bytes in flight ("BIFLY") activities;
a BIFLY module configured to initiate registration of changed tracks and keep track of BIFLY activities between the first storage volume and the second storage volume;
a query module configured to query the second storage volume for status of consistency groups ("CG") being formed at the third storage volume; and
a toggle module configured to toggle bitmaps, wherein:
the third storage volume is configured to receive an asynchronous copy of the first data from the first storage volume via the second connection and store the asynchronous copy of the first data as the third data in response to a resynchronization process if the second storage volume becomes unavailable.

25. The system of claim 24, further comprising a BIFLY manger module comprising a computer readable program executing on the host and configured to detect a failure at the second storage volume, merge the contents of N and N−1 bitmaps, and merge the results of the N and N−1 bitmaps into an Out-of-Synchronization bitmap.

26. The system of claim 25, wherein the BIFLY manger module is further configured to resynchronize the first storage volume and the third storage volume by sending the changed tracks to configure the second connection, wherein the second connection is a two-site Global Mirror disaster recovery configuration.

27. A method for deploying software to implement an incremental resynchronization, the method comprising:
transmitting data including tracks synchronously from a local volume to an intermediate volume;
transmitting the data asynchronously from the intermediate volume to a first remote volume via a first asynchronous connection;
transmitting the data, via a flash copy process from the first remote volume to a second remote volume;
initiating registration of changed tracks and keeping track of bytes in flight (BIFLY) activities;
recording the changed tracks in a bitmap;
ceasing to record the changed tracks in response to detection of a failure of the intermediate volume; and
starting a resynchronization process by asynchronously transmitting the changed tracks from the local volume to the first remote volume via a second asynchronous connection.

28. The method of claim 27, further comprising merging the contents of the N and N−1 bitmaps.

29. The method of clam 28, further comprising merging the results of the N and N−1 bitmaps into an Out-of-Synchronization bitmap.

30. The method of clam 27, further comprising querying the intermediate volume for status of consistency groups (CGs) being formed.

* * * * *